(12) United States Patent
Qin

(10) Patent No.: US 12,132,343 B2
(45) Date of Patent: Oct. 29, 2024

(54) CHARGING METHOD AND APPARATUS, CHARGING DEVICE, AND CHARGING SYSTEM

(71) Applicant: AUTEL ROBOTICS CO., LTD., Guangdong (CN)

(72) Inventor: Wei Qin, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 583 days.

(21) Appl. No.: 17/387,738

(22) Filed: Jul. 28, 2021

(65) Prior Publication Data

US 2022/0021232 A1 Jan. 20, 2022

Related U.S. Application Data

(63) Continuation of application No. PCT/CN2019/101800, filed on Aug. 21, 2019.

(30) Foreign Application Priority Data

Jan. 28, 2019 (CN) .......................... 201910081867.7

(51) Int. Cl.
*H02J 7/00* (2006.01)
(52) U.S. Cl.
CPC ........ *H02J 7/007194* (2020.01); *H02J 7/005* (2020.01); *H02J 7/00712* (2020.01)
(58) Field of Classification Search
CPC .............................................. H02J 7/007194
USPC ....................................................... 320/150
See application file for complete search history.

(56) References Cited

U.S. PATENT DOCUMENTS

| 4,670,703 A | * | 6/1987 | Williams | ............ H02J 7/00309 320/152 |
| 8,513,919 B2 | * | 8/2013 | Bhardwaj | ................. H02J 7/04 320/152 |
| 9,450,443 B2 | * | 9/2016 | Dai | ....................... G01R 31/392 |
| 2012/0025771 A1 | | 2/2012 | Bhardwaj et al. | |

(Continued)

FOREIGN PATENT DOCUMENTS

| CN | 105958588 A | 9/2016 |
| CN | 107565639 A | 1/2018 |

(Continued)

OTHER PUBLICATIONS

The First Chinese Office Action dated Sep. 29, 2023; Appln. No. 201910081867.7 with English Translation.

*Primary Examiner* — Yalkew Fantu

(57) ABSTRACT

Embodiments of the present invention relate to the field of charging technologies, and particularly to a charging method and apparatus, a charging device, and a charging system. The charging method is configured for charging a battery. The method includes: acquiring a number of charging cycles and a charging temperature of the battery; determining a target charging parameter according to the number of charging cycles and the charging temperature; and charging the battery according to the target charging parameter. By means of the method, the embodiments of the present invention can determine in real time a target charging parameter for charging a battery according to different aging degrees and temperature states of the battery, thereby improving the safety of charging.

19 Claims, 6 Drawing Sheets

(56) References Cited

U.S. PATENT DOCUMENTS

| | | | | |
|---|---|---|---|---|
| 2014/0042976 A1* | 2/2014 | Lan | ..................... | H02J 7/00719 |
| | | | | 320/130 |
| 2014/0062415 A1* | 3/2014 | Barsukov | ............ | H02J 7/00041 |
| | | | | 320/152 |
| 2018/0316200 A1* | 11/2018 | Yen | ..................... | H01M 10/425 |

FOREIGN PATENT DOCUMENTS

| | | |
|---|---|---|
| CN | 108808759 A | 11/2018 |
| CN | 109786876 A | 5/2019 |

\* cited by examiner

CHARGING METHOD AND APPARATUS, CHARGING DEVICE, AND CHARGING SYSTEM

CROSS-REFERENCE TO RELATED APPLICATIONS

This application is a continuation of International Application No. PCT/CN2019/101800, filed on Aug. 21, 2019, which claims priority to Chinese Patent Application No. 201910081867.7 filed on Jan. 28, 2019, which is incorporated herein by reference in its entirety.

TECHNICAL FIELD

Embodiments of the present invention relate to the field of charging technologies, and particularly to a charging method and apparatus, a charging device, and a charging system.

BACKGROUND

Lithium battery is a kind of battery that uses lithium metal or lithium alloy as anode and cathode materials and uses a non-aqueous electrolyte solution. It has sensitive temperature characteristics. If a lithium battery is charged with the same charging current under different temperature conditions, the lithium battery is very likely to catch fire and explode, posing safety hazards.

SUMMARY

Embodiments of the present invention are directed to a charging method and apparatus, a charging device, and a charging system, which can determine in real time a target charging parameter for charging a battery according to different aging degrees and temperature states of the battery, thereby improving the safety of charging.

To solve the above technical problem, a technical solution adopted in the embodiments of the present invention is as follows: Provided is a charging method, configured for charging a battery, the method including:
  acquiring a number of charging cycles and a charging temperature of the battery;
  determining a target charging parameter according to the number of charging cycles and the charging temperature; and
  charging the battery according to the target charging parameter.

Optionally, the determining a target charging parameter according to the number of charging cycles and the charging temperature includes:
  selecting any one of the number of charging cycles and the charging temperature as a first index value and the other one as a second index value, where each index value is configured for selecting a corresponding preset index range;
  determining a second preset index range corresponding to the second index value in a first preset index range corresponding to the first index value; and
  determining a preset charging parameter corresponding to the second preset index range as the target charging parameter.

Optionally, a type of the second preset index range includes a one-way current adjustment range and a current-voltage adjustment range;
  if the type of the second preset index range is the one-way current adjustment range, the preset charging parameter corresponding to the second preset index range includes a current parameter; and
  if the type of the second preset index range is the current-voltage adjustment range, the preset charging parameter corresponding to the second preset index range includes a current parameter and a voltage parameter.

Optionally, the current parameter is a preset charging rate; and
  the voltage parameter is a preset voltage factor, where the preset voltage factor is less than 1.

Optionally, when the determined target charging parameter is the preset charging rate, the charging the battery according to the target charging parameter includes:
  determining an actual charging current according to the preset charging rate; and
  charging the battery by using the actual charging current and a highest charging voltage of the battery.

Optionally, the actual charging current is a product of a battery capacity of the battery and the preset charging rate.

Optionally, when the determined target charging parameter is the preset charging rate and the preset voltage factor, the charging the battery according to the target charging parameter includes:
  determining an actual charging current according to the preset charging rate; and
  determining an actual charging voltage according to the preset voltage factor; and
  charging the battery by using the actual charging current and the actual charging voltage.

Optionally, the actual charging voltage is a product of a highest charging voltage of the battery and the preset voltage factor.

Optionally, before the determining a target charging parameter according to the number of charging cycles and the charging temperature, the method further includes:
  determining whether the number of charging cycles and/or the charging temperature meets a preset charging condition;
  if yes, determining the target charging parameter according to the number of charging cycles and the charging temperature; and
  if not, stopping charging.

Optionally, the determining whether the number of charging cycles and/or the charging temperature meets a preset charging condition includes:
  determining whether the number of charging cycles is greater than a preset number threshold and/or whether the charging temperature falls within a preset normal temperature range.

Optionally, the acquiring a number of charging cycles and a charging temperature of the battery includes:
  establishing a communication port with the battery; and
  acquiring the number of charging cycles and the charging temperature of the battery based on the communication port.

To solve the above technical problem, another technical solution adopted in the embodiments of the present invention is as follows: Provided is a charging apparatus, configured for charging a battery, the apparatus including:
  an acquisition module, configured to acquire a number of charging cycles and a charging temperature of the battery;
  a determining module, configured to determine a target charging parameter according to the number of charging cycles and the charging temperature; and a charging module, configured to charge the battery according to the target charging parameter.

Optionally, the determining module is further configured to:

select any one of the number of charging cycles and the charging temperature as a first index value and the other one as a second index value, where each index value is configured for selecting a corresponding preset index range;

determine a second preset index range corresponding to the second index value in a first preset index range corresponding to the first index value; and determine a preset charging parameter corresponding to the second preset index range as the target charging parameter.

Optionally, a type of the second preset index range includes a one-way current adjustment range and a current-voltage adjustment range;

if the type of the second preset index range is the one-way current adjustment range, the preset charging parameter corresponding to the second preset index range includes a current parameter; and if the type of the second preset index range is the current-voltage adjustment range, the preset charging parameter corresponding to the second preset index range includes a current parameter and a voltage parameter.

Optionally, the current parameter is a preset charging rate; and the voltage parameter is a preset voltage factor, where the preset voltage factor is less than 1.

Optionally, when the determined target charging parameter is the preset charging rate, the charging module is further configured to:

determine an actual charging current according to the preset charging rate; and charge the battery by using the actual charging current and a highest charging voltage of the battery.

Optionally, the actual charging current is a product of a battery capacity of the battery and the preset charging rate.

Optionally, when the determined target charging parameter is the preset charging rate and the preset voltage factor, the charging module is further configured to:

determine an actual charging current according to the preset charging rate; and determine an actual charging voltage according to the preset voltage factor; and charge the battery by using the actual charging current and the actual charging voltage.

Optionally, the actual charging voltage is a product of a highest charging voltage of the battery and the preset voltage factor.

Optionally, the apparatus further includes:

a judging module, configured to determine whether the number of charging cycles and/or the charging temperature meets a preset charging condition;

if yes, determine the target charging parameter according to the number of charging cycles and the charging temperature; and if not, stop charging.

Optionally, the judging module is further configured to:

determine whether the number of charging cycles is greater than a preset number threshold and/or whether the charging temperature falls within a preset normal temperature range.

Optionally, the acquiring module is further configured to:

establish a communication port with the battery; and acquire the number of charging cycles and the charging temperature of the battery based on the communication port.

To solve the above technical problem, another technical solution adopted in the embodiments of the present invention is as follows: Provided is a charging device, including:

at least one processor; and a memory communicatively connected to the at least one processor, the memory storing instructions executable by the at least one processor, the instructions being executed by the at least one processor, to enable the at least one processor to perform the charging method described above.

To solve the above technical problem, another technical solution adopted in the embodiments of the present invention is as follows: Provided is a charging system, including:

a battery;

the charging device described above, where the processor communicates with the battery through a communication port.

To solve the above technical problem, another technical solution adopted in the embodiments of the present invention is as follows: Provided is a non-volatile computer readable storage medium, storing computer executable instructions therein, the computer executable instructions being configured to cause a charging device to execute the charging method described above.

Beneficial effects of the embodiments of the present invention are as follows: Different from the prior art, the embodiments of the present invention provide a charging method and apparatus, a charging device, and a charging system, and in the charging method, a number of charging cycles and a charging temperature of a battery are acquired, and a target charging parameter for charging the battery is determined according to the acquired number of charging cycles and the acquired charging temperature, so that the determined target charging parameter can match the aging degree and the temperature state of the battery and is more precise, thereby improving the safety of charging.

BRIEF DESCRIPTION OF THE DRAWINGS

One or more embodiments are described by way of example with reference to the corresponding figures in the accompanying drawings, and the exemplary descriptions do not constitute a limitation on the embodiments. Elements in the accompanying drawings having same reference numerals are represented as similar elements, and unless otherwise particularly stated, the figures in the accompanying drawings are not drawn to scale.

FIG. 4b is a schematic structural diagram of an amplification circuit, a filtering circuit, and a voltage follower in the charging system shown in FIG. 4a;

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the embodiments of the present invention without creative efforts shall fall within the protection scope of the present invention.

It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", and similar expressions in this specification are merely used for an illustrative purpose.

In addition, technical features involved in the embodiments of the present invention described below may be combined with each other provided that there is no conflict between each other.

The present invention provides a charging method and apparatus. The method and apparatus are applicable to a charging device, to enable the charging device to, when charging a battery, determine in real time a target charging parameter for charging the battery according to a charging temperature and a number of charging cycles of the battery, so that the determined target charging parameter can match the aging degree and the temperature state of the battery, thereby improving the safety of charging.

The charging device in the present invention may be an independent device, such as a charger; or may also be a circuit module that can be integrated into a device. After the charging device is electrically connected to a battery, the charging device can charge the battery. The present invention will be described below in detail with reference to specific embodiments.

Embodiment 1

Figure 1:
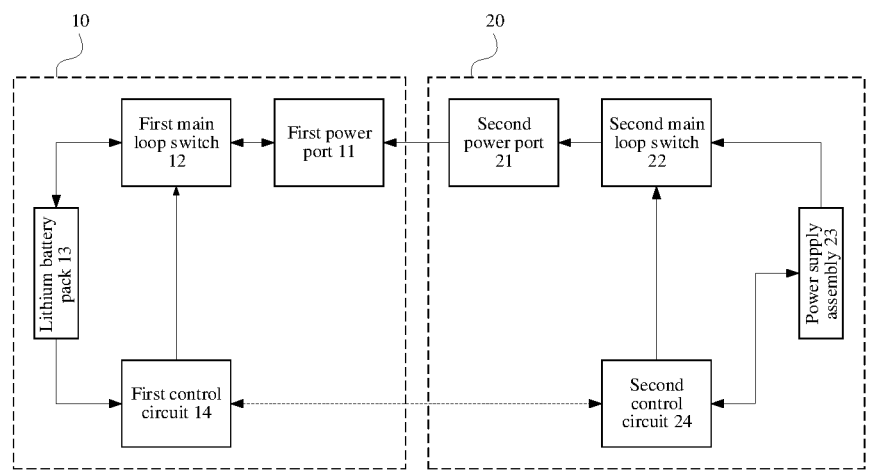
FIG. 1 is a schematic structural diagram of a charging system according to an embodiment of the present invention.

Referring to FIG. 1, an embodiment of the present invention provides a charging system, including a battery 10 and a charging device 20. The charging device 20 is electrically connected to the battery 10 to charge the battery 10, and the charging device 20 communicates with the battery 10 through a communication port.

Specifically, the battery 10 includes a first power port 11, a first main loop switch 12, a lithium battery pack 13 and a first control circuit 14. One end of the first main loop switch 12 is electrically connected to the first power port 11. Another end of the first main loop switch 12 is electrically connected to the lithium battery pack 13. A control end of the first main loop switch 12 is electrically connected to the first control circuit 14. The first control circuit 14 is electrically connected to the lithium battery pack 13.

The first power port 11 is preferably a USB port. The first power port 11 is configured to electrically connect to the charging device 20, so that the charging device 20 inputs a charging current and a charging voltage to the battery 10 through the first power port 11 for charging.

The lithium battery pack 13 consists of a rechargeable lithium-ion battery. The lithium-ion battery includes, but not limited to, a lithium polymer battery, a ternary polymer lithium battery, etc.

When the charging device 20 charges the battery 10 through the first power port 11, the lithium battery pack 13 is charged, so as to store electricity in the lithium battery pack 13.

The electricity in the lithium battery pack 13 is used to supply power to the first power port 11, the first main loop switch 12 and the first control circuit 14 to ensure that the battery 10 can operate normally.

The first main loop switch 12 may be an N-type metal oxide semiconductor (NMOS), or a P-type metal oxide semiconductor (PMOS), or an insulated gate bipolar transistor (IGBT), or a triode, etc.

An on/off status of the first main loop switch 12 can control a connected/disconnected status between the first power port 11 and the lithium battery pack 13. When the first main loop switch 12 is on, the first power port 11 is connected to the lithium battery pack 13. In this case, if the first power port 11 is electrically connected to the charging device 20, the charging device 20 can input the charging current and the charging voltage to the lithium battery pack 13. When the first main loop switch 12 is off, the first power port 11 is disconnected from the lithium battery pack 13. In this case, if the first power port 11 is electrically connected to the charging device 20, the charging device 20 cannot input the charging current and the charging voltage to the lithium battery pack 13.

The on/off status of the first main loop switch 12 is controlled by the first control circuit 14.

The first control circuit 14 is further configured to acquire a charging temperature and a number of charging cycles of the battery. In the embodiments of the present invention, the charging temperature and the number of charging cycles acquired by the first control circuit 14 are in fact the charging temperature and the number of charging cycles of the lithium battery pack 13. The charging temperature is a surface temperature of the lithium battery pack 13. The charging temperature may be an average value of surface temperatures of all lithium batteries or a maximum value of the surface temperatures. The number of charging cycles is a total number of complete and partial discharging cycles of the lithium battery pack 13. The number of charging cycles represents the aging degree of the lithium battery pack 13. The larger the number of charging cycles, the higher the aging degree of the lithium battery pack 13, and the smaller the charging current and the charging voltage allowed for charging the lithium battery pack 13.

The first control circuit 14 includes electronic components such as a controller that can complete coordination and instruct the system to operate.

Further, the charging device 20 includes a second power port 21, a second main loop switch 22, a power supply assembly 23 and a second control circuit 24. One end of the second main loop switch 22 is electrically connected to the second power port 21. Another end of the second main loop switch 22 is electrically connected to the power supply assembly 23. A control end of the second main loop switch 22 is electrically connected to the second control circuit 24. The second control circuit 24 is electrically connected to the power supply assembly 23.

The power supply assembly 23 is a power supply of the charging device 20, and the charging device 20 supplies power to the battery 10 by using the power supply assembly 23. In addition, the power supply assembly 23 is further configured to supply power to the second power port 21, the second main loop switch 22 and the second control circuit 24 to ensure that the charging device 20 can operate normally.

Figure 2:
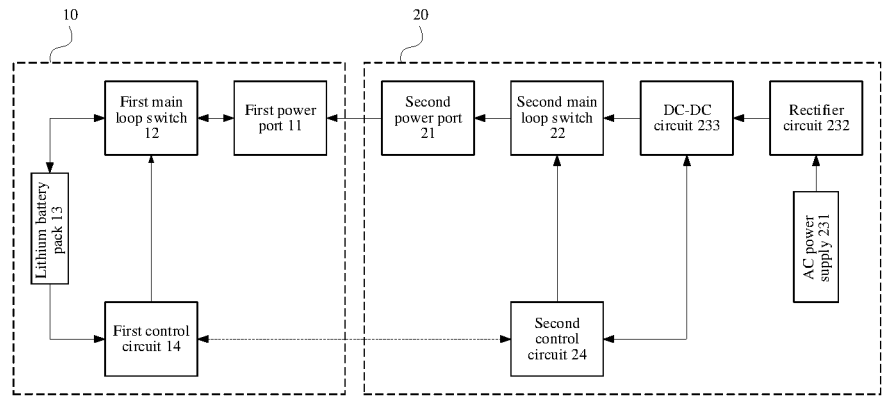
FIG. 2 is a schematic structural diagram of a charging system according to another embodiment of the present invention.

Referring to FIG. 2, the power supply assembly 23 includes an AC power supply 231, a rectifier circuit 232 and a DC-DC circuit 233. An input end of the rectifier circuit 232 is electrically connected to the AC power supply 231. An output end of the rectifier circuit 232 is electrically connected to an input end of the DC-DC circuit 233. An output end of the DC-DC circuit 233 is electrically connected to the second main loop switch 22. A control end of the DC-DC circuit 233 is electrically connected to the second control circuit 24.

The AC power supply 231 is configured to provide an AC charging current and an AC charging voltage. The rectifier circuit 232 is configured to convert AC to DC, including converting the AC charging current to a DC charging current and converting the AC charging voltage to a DC charging voltage. The DC-DC circuit 233 is configured to adjust the converted charging current and/or charging voltage, and output the charging current and the charging voltage. For example: when the DC-DC circuit 233 only adjusts the converted charging current, the DC-DC circuit 233 outputs the adjusted charging current and the unadjusted charging voltage. When the DC-DC circuit 233 adjusts the converted charging current and charging voltage, the DC-DC circuit 233 outputs the adjusted charging current and the adjusted charging voltage.

The power supply assembly 23 supplies power to the second power port 21, the second main loop switch 22 and the second control circuit 24 only after the charging current and/or the charging voltage is adjusted by the DC-DC circuit 233, so as to ensure that the charging device 20 can operate normally.

Preferably, the DC-DC circuit 233 is a buck-boost circuit, which can increase the charging current and/or the charging voltage, and can also decrease the charging current and/or the charging voltage.

Of course, in some alternative embodiments, the DC-DC circuit 233 may be a boost circuit, which can only increase the charging current and/or the charging voltage; or, the DC-DC circuit 233 may be a buck circuit, which can only decrease the charging current and/or the charging voltage.

Figure 3:
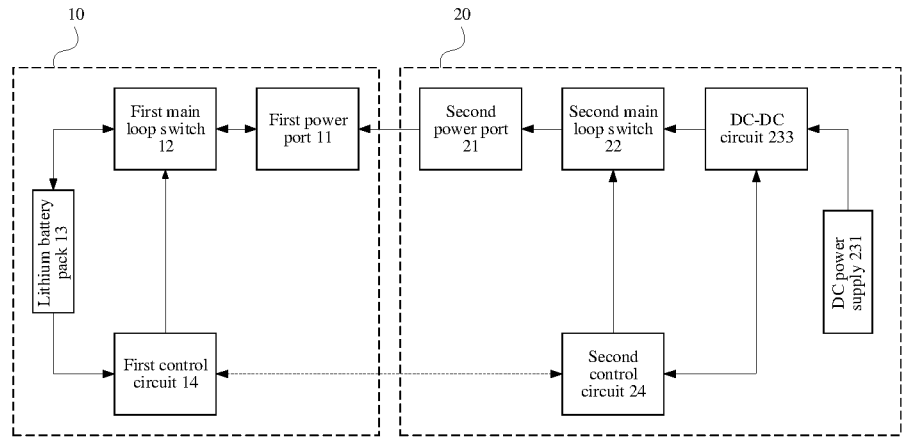
FIG. 3 is a schematic structural diagram of a charging system according to another embodiment of the present invention.

Of course, referring to FIG. 3, in some other alternative embodiments, when the AC power supply 231 is replaced with a DC power supply, the rectifier circuit 232 can be omitted in the power supply assembly 23. In this case, the input end of the DC-DC circuit 233 is electrically connected the DC power supply 231, the output end of the DC-DC circuit 233 is electrically connected to the second main loop switch 22, and the control end of the DC-DC circuit 233 is electrically connected to the second control circuit 24. The DC power supply 231 is configured to provide a DC charging current and a DC charging voltage. The DC-DC circuit 233 is configured to adjust the charging current and/or the charging voltage.

The second power port 21 is preferably a USB port, and the charging device 20 is electrically connected to the first power port 11 of the battery 10 through the second power port 21 to input a charging current and a charging voltage to the battery 10 to charge the battery 10.

The second main loop switch 22 may be an NMOS, or a PMOS, or an IGBT, or a triode, etc.

An on/off status of the second main loop switch 22 can control a connected/disconnected status between the second power port 21 and the DC-DC circuit 233. When the second main loop switch 22 is on, the second power port 21 is connected to the DC-DC circuit 233. In this case, if the second power port 21 is electrically connected to the first power port 11, the charging current and the charging voltage output from the DC-DC circuit 233 can be input to the first power port 11 through the second power port 21. When the second main loop switch 22 is off, the second power port 21 is disconnected from the DC-DC circuit 233. In this case, if the second power port 21 is electrically connected to the first power port 11, the charging current and the charging voltage output by the DC-DC circuit 233 cannot be input to the first power port 11 through the second power port 21.

The on/off status of the second main loop switch 22 is controlled by the second control circuit 24, and adjustment of the charging current and/or the charging voltage of the DC-DC circuit 233 is also controlled by the second control circuit 24.

The second control circuit 24 includes electronic components such as a controller that can complete coordination and instruct the system to operate.

The second control circuit 24 establishes a communication port with the battery 10 after the first power port 11 is electrically connected to the second power port 21. Specifically, the second control circuit 24 establishes a communication port with the first control circuit 14 to communicate with the first control circuit 14 through the communication port, that is, the communication between the charging device 20 and the battery 10 is implemented through the second control circuit 24 and the first control circuit 14. In this case, the second control circuit 24 executes the charging method of the present invention, so that the charging device 20 can determine in real time a target charging parameter for charging the battery 10. The second control circuit 24 controls on/off of the second main loop switch 22, controls the DC-DC circuit 233 to adjust the charging current and/or the charging voltage, and controls the first control circuit 14 to control on/off of the first main loop switch 12.

Specifically, the second control circuit 24 acquires the charging temperature and the number of charging cycles of the battery based on the communication port.

Because the first control circuit 14 has acquired the charging temperature and the number of charging cycles of the lithium battery pack 13 in the battery 10, the second control circuit 24 can directly acquire the charging temperature and the number of charging cycles of the battery from the first control circuit 14 through the communication port after establishing a communication connection with the first control circuit 14.

Further, after acquiring the charging temperature and the number of charging cycles of the battery, the second control circuit 24 determines whether the acquired number of charging cycles and/or the acquired charging temperature meets a preset charging condition.

The determining whether the acquired number of charging cycles and the acquired charging temperature meet a preset charging condition includes: determining whether the number of charging cycles is greater than a preset number threshold and/or whether the charging temperature falls within a preset normal temperature range.

If the number of charging cycles is greater than the preset number threshold and/or the charging temperature is not within the preset normal temperature range, it is determined that the preset charging condition is not met.

If the number of charging cycles is not greater than the preset number threshold and/or the charging temperature is within the preset normal temperature range, it is determined that the preset charging condition is met.

The preset number threshold is a maximum number of cycles that the lithium battery pack can allow, which is related to the properties of the lithium battery pack. Different lithium battery packs have different preset number thresholds. The user can look up the lithium battery instruction manual, and store the preset number threshold in advance.

The preset normal temperature range is a range of temperatures at which the lithium battery pack can operate. The preset normal temperature range is a temperature range pre-stored by the user according to the lithium battery instruction manual. Preferably, the preset normal temperature range is $-10°$ C.-45° C., including the two endpoints $-10°$ C. and 45° C. Based on this, when the charging temperature is less than $-10°$ C. or greater than 45° C., it is determined that the charging temperature is not within the preset normal temperature range; when the charging temperature is not less than $-10°$ C. and not greater than 45° C., it is determined that the charging temperature is within the preset normal temperature range.

When determining that the acquired number of charging cycles and/or the acquired charging temperature meets the preset charging condition, the second control circuit 24 determines the target charging parameter according to the number of charging cycles and the charging temperature, and charges the battery 10 according to the determined target charging parameter.

The determining a target charging parameter according to the number of charging cycles and the charging temperature specifically includes: selecting, by the second control circuit 24, any one of the number of charging cycles and the charging temperature as a first index value and the other one as a second index value, where each index value is configured for selecting a corresponding preset index range; then determining a second preset index range corresponding to the second index value in a first preset index range corresponding to the first index value; and determining a preset charging parameter corresponding to the second preset index range as the target charging parameter.

Preset index ranges include number index ranges and temperature index ranges, and the number index ranges correspond to the temperature index ranges. Specifically, each number index range corresponds to all the temperature index ranges, each temperature index range also corresponds to all the number index ranges, and one number index range and one temperature index range jointly determine the preset charging parameter.

For example, when the number index ranges include N<50, 50≤N<100 and the temperature index ranges include $-10°$ C.≤T<0° C., 0° C.≤T<10° C., 10° C.≤T<40° C., temperature index ranges corresponding to the number index range N<50 include $-10°$ C.≤T<0° C., 0° C.≤T<10° C., 10° C.≤T<40° C., and temperature index ranges corresponding to the number index range 50≤N<100 include $-10°$ C.≤T<0° C., 0° C.≤T<10° C., 10° C.≤T<40° C.; number index ranges corresponding to the temperature index range $-10°$ C.≤T<0° C. include N<50, 50≤N<100, number index ranges corresponding to the temperature index range 0° C.≤T<10° C. include N<50, 50≤N<100, and number index ranges corresponding to the temperature index range 10° C.≤T<40° C. include N<50, 50≤N<100.

When the index value is the number of charging cycles, a corresponding preset index range is selected from the number index ranges; when the index value is the charging temperature, a corresponding preset index range is selected from the temperature index ranges.

Based on this, to determine the target charging parameters according to the number of charging cycles and the charging temperature, it is necessary to set an index sequence for the number of charging cycles and the charging temperature.

Specifically, the first index value is an index value preferentially used for determining one preset index range, and the second index value is an index value used for determining another preset index range after the one preset index range is determined using the first index value.

When the number of charging cycles is selected as the first index value, the charging temperature is the second index value. In this case, after the first preset index range is determined from the number index ranges according to the number of charging cycles, the second preset index range is determined from the temperature index ranges corresponding to the first preset index range according to the charging temperature, and the preset charging parameter corresponding to the second preset index range is the preset charging parameter determined jointly by one number index range and one temperature index range, i.e., the target charging parameter.

For example, when the number of charging cycles acquired by the second control circuit 24 is 20 and the charging temperature acquired is 15° C., the second control circuit 24 determines, from the number index ranges according to the number of charging cycles which is 20, that the first preset index range is N<50, and determines that temperature index ranges corresponding to the first preset index range include $-10°$ C.≤T<0° C., 0° C.≤T<10° C., 10° C.≤T<40° C. Then the second control circuit 24 determines, from $-10°$ C.≤T<0° C., 0° C.≤T<10° C., 10° C.<T<40° C. according to the charging temperature which is 15° C., that the second preset index range is 10° C.≤T<40° C. In this case, the preset charging parameter corresponding to 10° C.≤T<40° C. is 0.2 C, and then 0.2 C is determined as the target charging parameter.

In this case, the first preset index range is a number index range, and the second preset index range is a temperature index range corresponding to the first preset index range.

When the charging temperature is selected as the first index value, the number of charging cycles is the second index value. In this case, after the first preset index range is determined from the temperature index ranges according to the charging temperature, the second preset index range is determined from the number index ranges corresponding to the first preset index range according to the number of charging cycles, and the preset charging parameter corresponding to the second preset index range is the preset charging parameter determined jointly by one number index range and one temperature index range, i.e., the target charging parameter. When the charging temperature is selected as the first index value, the number of charging cycles is the second index value. In this case, after the first preset index range is determined in the temperature index range according to the charging temperature, it is in the first preset index range according to the number of charging cycles A second preset index range is determined in the corresponding number index range, and the preset charging parameter corresponding to the second preset index range is the preset charging parameter determined jointly by a number index range and a temperature index range, that is, the target charging parameter.

For example, when the number of charging cycles acquired by the second control circuit 24 is 20 and the charging temperature acquired is 15° C., the second control circuit 24 determines, from the temperature index ranges according to the charging temperature which is 15° C., that the first preset index range is 10° C.≤T<40° C., and determines that number index ranges corresponding to the first preset index range include N<50, 50≤N<100. Then the second control circuit 24 determines, from N<50, 50≤N<100 according to the number of charging cycles which is 20, that the second preset index range is N<50. In this case, the preset charging parameter corresponding to N<50 is 0.2 C, and then 0.2 C is determined as the target charging parameter.

In this case, the first preset index range is a temperature index range, and the second preset index range is a number index range corresponding to the first preset index range.

It is understandable that the second preset index range is a range according to which the target charging parameter can be directly determined, and a type of the second preset index range includes a one-way current adjustment range and a current-voltage adjustment range.

If the type of the second preset index range is the one-way current adjustment range, the preset charging parameter corresponding to the second preset index range includes a current parameter;
if the type of the second preset index range is the current-voltage adjustment range, the preset charging parameter corresponding to the second preset index range includes a current parameter and a voltage parameter.

The current parameter is a preset charging rate; and the voltage parameter is a preset voltage factor, where the preset voltage factor is less than 1.

For example, when the charging temperature is the second index value, if the second preset index range determined according to the charging temperature is 40° C.≤T<45° C. and the type of the second preset index range is the current-voltage adjustment range, the preset charging parameter corresponding to the second preset index range includes a current parameter and a voltage parameter. By setting the current parameter and the voltage parameter under high temperature conditions, the second control circuit can charge the battery with a low voltage parameter when the charging temperature is too high, thereby preventing circuit damage.

Further, when the determined target charging parameter is the preset charging rate, the charging the battery 10 according to the target charging parameter includes:
determining an actual charging current according to the preset charging rate; and charging the battery 10 by using the actual charging current and a highest charging voltage of the battery 10. In this case, the charging current becomes the actual charging current, and the charging voltage is still the highest charging voltage of the battery.

The actual charging current is a product of a battery capacity of the battery 10. Based on this, the determining an actual charging current according to the preset charging rate includes:
The second control circuit 24 acquires the battery capacity from the battery 10, and calculates the actual charging current according to the acquired battery capacity and the determined preset charging rate.

The highest charging voltage of the battery 10 is determined by the battery 10.

Because the charging current becomes the actual charging current and the charging voltage is still the highest charging voltage of the battery, the second control circuit 24, when using the actual charging current and the highest charging voltage of the battery 10 to charge the battery 10, controls the DC-DC circuit 233 to adjust the charging current to the actual charging current, not the charging voltage, so that the charging voltage is still maintained at the highest charging voltage of the battery; then the second control circuit 24 controls the second main loop switch 22 to switch on, so that the charging voltage and the charging current that has been adjusted by the DC-DC circuit 233 can be input to the first power port 11 through the second power port 21; and the second control circuit 24 further sends a control command to the first control circuit 14, to cause the first control circuit 14 to control the first main loop switch 12 to switch on, so that the charging current and the charging voltage input to the first power port 11 are input to the lithium battery pack 13, to charge the battery 10.

When the determined target charging parameter is the preset charging rate and the preset voltage factor, the charging the battery according to the target charging parameter specifically includes:
determining an actual charging current according to the preset charging rate, determining an actual charging voltage according to the preset voltage factor, and charging the battery 10 by using the actual charging current and the actual charging voltage. In this case, the charging current becomes the actual charging current, and the charging voltage becomes the actual charging voltage.

The actual charging current is a product of a battery capacity of the battery 10. Based on this, the determining an actual charging current according to the preset charging rate includes:
The second control circuit 24 acquires the battery capacity from the battery 10, and calculates the actual charging current according to the acquired battery capacity and the determined preset charging rate.

The actual charging voltage is a product of the highest charging voltage of the battery 10 and the preset voltage factor. Based on this, the determining an actual charging current according to the preset charging rate includes:
determining, by the second control circuit 24, the highest charging voltage of the battery 10, and calculating the actual charging voltage according to the determined highest charging voltage and the preset voltage factor.

Because the charging current becomes the actual charging current and the charging voltage becomes the actual charging voltage, charging the battery 10 by using the actual charging current and the actual charging voltage includes: the second control circuit 24 controls the DC-DC circuit 233 to adjust the charging current to the actual charging current and adjust the charging voltage to the actual charging voltage; then the second control circuit 24 controls the second main loop switch 22 to switch on, so that the charging voltage and the charging current that have been adjusted by the DC-DC circuit 233 can be input to the first power port 11 through the second power port 21; and the second control circuit 24 further sends a control command to the first control circuit 14, to cause the first control circuit 14 to control the first main loop switch 12 to switch on, so that the charging current and the charging voltage input to the first power port 11 are input to the lithium battery pack 13, to charge the battery 10.

When the second control circuit 24 determines that the acquired number of charging cycles and/or the acquired charging temperature does not meet the preset charging condition, charging is stopped.

Specifically, the second control circuit 24 controls the second main loop switch 12 to switch off to prohibit the charging device 20 from outputting the charging current and the charging voltage, and thus stop charging.

Figure 4A:
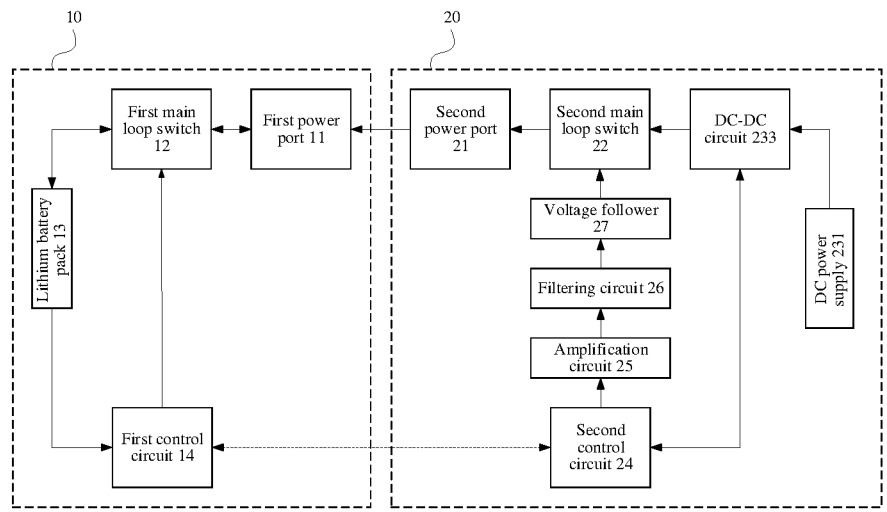
FIG. 4a is a schematic structural diagram of a charging system according to another embodiment of the present invention.

Further, referring to FIG. 4a, in some embodiments, the charging device 20 further includes an amplification circuit 25, a filtering circuit 26 and a voltage follower 27. An input end of the amplification circuit 25 is electrically connected to the second control circuit 24. An output end of the amplification circuit 25 is electrically connected to an input end of the filtering circuit 26. An output end of the filtering circuit 26 is electrically connected to an input end of the voltage follower 27. An output end of the voltage follower 27 is electrically connected to the second main loop switch 22.

Figure 4B:
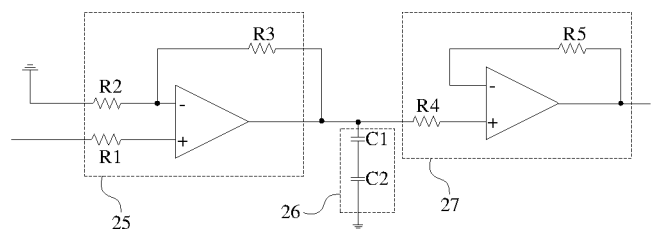

Specifically, referring to FIG. 4b, the amplification circuit 25 includes a first operational amplifier, a first resistor R1, a second resistor R2 and a third resistor R3. One end of the first resistor R1 is electrically connected to the second control circuit 24, and an other end of the first resistor R1 is electrically connected to a non-inverting input end of the first operational amplifier. One end of the second resistor R2 is grounded, and an other end of the second resistor R2 is electrically connected to an inverting input end of the first operational amplifier and one end of the third resistor R3. An other end of the third resistor R3 is electrically connected to an output end of the first operational amplifier.

The filtering circuit 26 includes a first capacitor C1 and a second capacitor C2. One end of the first capacitor C1 is electrically connected to the other end of the third resistor R3 and the output end of the first operational amplifier. The other end of the first capacitor C1 is electrically connected to one end of the second capacitor C2. An other end of the second capacitor C2 is grounded.

The voltage follower 27 includes a fourth resistor R4, a second operational amplifier and a fifth resistor R5. One end of the fourth resistor R4 is electrically connected to the other end of the third resistor R3, the output end of the first operational amplifier and one end of the first capacitor C1. An other end of the fourth resistor R4 is electrically connected to the non-inverting input end of the second operational amplifier. One end of the fifth resistor R5 is electrically connected to the inverting input end of the second operational amplifier, and an other end of the fifth resistor R5 is electrically connected to the output end of the second operational amplifier.

The amplification circuit 25 is configured to amplify a signal output by the second control circuit 24. The filtering circuit 26 is configured to filter the signal amplified by the amplification circuit 25. The voltage follower 27 is configured to stabilize the signal input to the second main loop switch 22.

The amplification circuit 25, the filtering circuit 26 and the voltage follower 27 can increase the switching rate, so that the second control circuit 24 can quickly control the charging device 20 to stop charging, thereby improving the safety of charging.

Of course, the circuit formed by the amplification circuit 25, the filtering circuit 26 and the voltage follower 27 in this embodiment is only an example of increasing the switching rate, and any other circuit combination that can achieve the same effect also fall within the scope of patent protection of the present invention. The circuit structure of the amplification circuit 25, the filtering circuit 26 and the voltage follower 27 is not limited to the structure described in this embodiment.

Figure 5:
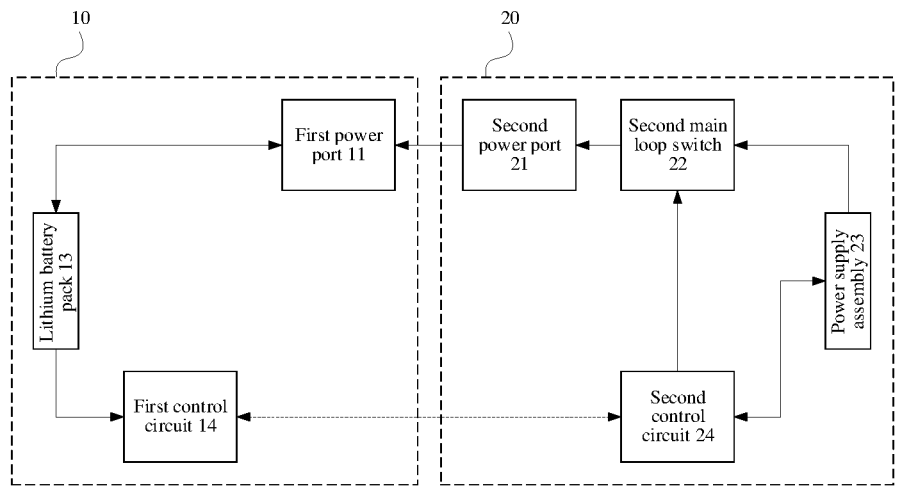
FIG. 5 is a schematic structural diagram of a charging system according to another embodiment of the present invention.

Referring to FIG. 5, in some other alternative embodiments, the battery 10 may not include the first main loop switch 12. In this case, the lithium battery pack 13 is electrically connected to the first power port 11 and the first control circuit 14 respectively. The charging current and the charging voltage input to the first power port 11 can be directly input to the lithium battery pack 13 without control of the first control circuit 14.

Figure 6:
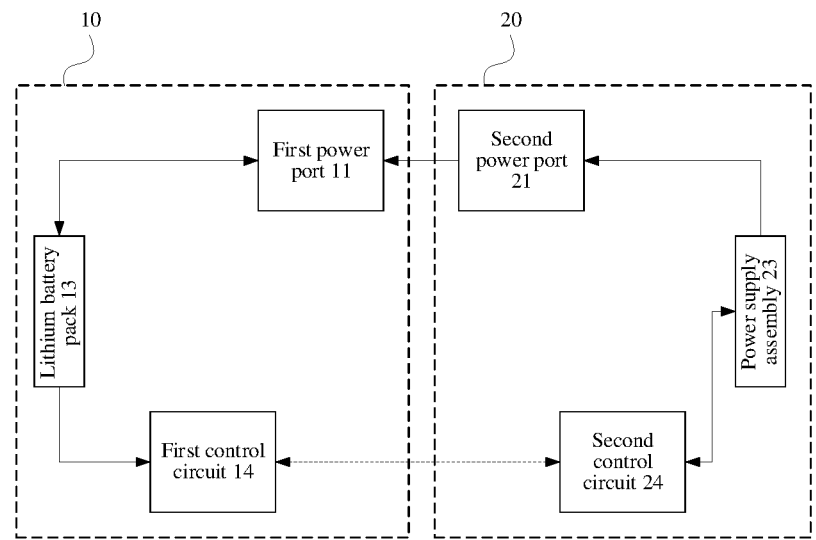
FIG. 6 is a schematic structural diagram of a charging system according to another embodiment of the present invention.

Referring to FIG. 6, in some other alternative embodiments, the charging device 20 may not include the second main loop switch 22. In this case, the power supply assembly 23 is electrically connected to the second power port 21 and the second control circuit 24 respectively. The charging current and the charging voltage output by the power supply assembly 23 can be directly input to the first power port 11 through the second power port 21 without control of the second control circuit 24. In addition, the second control circuit 24 cannot control the charging device 20 to stop charging when the charging temperature is not within the preset normal temperature range.

In the embodiments of the present invention, the charging device determines in real time a target charging parameter for charging a battery according to a charging temperature and a number of charging cycles that are acquired from the battery, so that the determined target charging parameter can match the aging degree and the temperature state of the battery, thereby improving the safety of charging.

Embodiment 2

Figure 7:
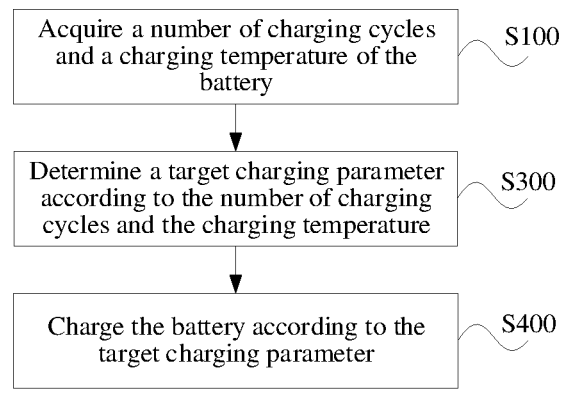
FIG. 7 is a schematic flowchart of a charging method according to an embodiment of the present invention.

Refer to FIG. 7, which is a schematic flowchart of a charging method according to an embodiment of the present invention. The charging method is applied to a charging device and configured for charging a battery. The charging device is the charging device 20 described in the above-mentioned embodiment. The method provided in this embodiment of the present invention is executed by the above-mentioned second control circuit 24 and is configured for determining in real time a target charging parameter for charging the battery. The charging method includes the following steps:

S100: Acquire a number of charging cycles and a charging temperature of the battery.

In the embodiments of the present invention, the charging temperature is a surface temperature of a lithium battery pack in the battery, and the charging temperature may be an average value of surface temperatures of all lithium batteries or a maximum value of the surface temperatures.

The number of charging cycles is a total number of complete and partial discharging cycles of the lithium battery pack, and represents the aging degree of the lithium battery pack in the battery. The larger the number of charging cycles, the higher the aging degree of the lithium battery pack, and the smaller the charging current and the charging voltage allowed for charging the lithium battery pack.

The acquiring a number of charging cycles and a charging temperature of the battery specifically includes: establishing a communication port with the battery, and acquiring the charging temperature and the number of charging cycles of the battery based on the communication port.

S300: Determine a target charging parameter according to the number of charging cycles and the charging temperature.

The determining a target charging parameter according to the number of charging cycles and the charging temperature specifically includes: selecting any one of the number of charging cycles and the charging temperature as a first index value and the other one as a second index value, where each index value is configured for selecting a corresponding preset index range; then determining a second preset index range corresponding to the second index value in a first preset index range corresponding to the first index value; and determining a preset charging parameter corresponding to the second preset index range as the target charging parameter.

Preset index ranges include number index ranges and temperature index ranges, and the number index ranges correspond to the temperature index ranges. Specifically, each number index range corresponds to all the temperature index ranges, each temperature index range also corresponds to all the number index ranges, and one number index range and one temperature index range jointly determine the preset charging parameter.

For example, when the number index ranges include $N<50$, $50 \leq N<100$ and the temperature index ranges include $-10°$ C.$\leq T<0°$ C., $0°$ C.$\leq T<10°$ C., $10°$ C.$\leq T<40°$ C., temperature index ranges corresponding to the number index range $N<50$ include $-10°$ C.$\leq T<0°$ C., $0°$ C.$\leq T<10°$ C., $10°$ C.$\leq T<40°$ C., and temperature index ranges corresponding to the number index range $50 \leq N<100$ include $-10°$ C.$\leq T<0°$ C., $0°$ C.$\leq T<10°$ C., $10°$ C.$\leq T<40°$ C.; number index ranges corresponding to the temperature index range $-10°$ C.$\leq T<0°$ C. include $N<50$, $50 \leq N<100$, number index ranges corresponding to the temperature index range $0°$ C.$\leq T<10°$ C. include $N<50$, $50 \leq N<100$, and number index ranges corresponding to the temperature index range $10°$ C.$\leq T<40°$ C. include $N<50$, $50 \leq N<100$.

When the index value is the number of charging cycles, a corresponding preset index range is selected from the number index ranges; when the index value is the charging temperature, a corresponding preset index range is selected from the temperature index ranges.

Based on this, to determine the target charging parameters according to the number of charging cycles and the charging temperature, it is necessary to set an index sequence for the number of charging cycles and the charging temperature.

Specifically, the first index value is an index value preferentially used for determining one preset index range, and the second index value is an index value used for determining another preset index range after the one preset index range is determined using the first index value.

When the number of charging cycles is selected as the first index value, the charging temperature is the second index value. In this case, after the first preset index range is determined from the number index ranges according to the number of charging cycles, the second preset index range is determined from the temperature index ranges corresponding to the first preset index range according to the charging temperature, and the preset charging parameter corresponding to the second preset index range is the preset charging parameter determined jointly by one number index range and one temperature index range, i.e., the target charging parameter.

For example, when the number of charging cycles acquired by the second control circuit 24 is 20 and the charging temperature acquired is $15°$ C., the second control circuit 24 determines, from the number index ranges according to the number of charging cycles which is 20, that the first preset index range is $N<50$, and determines that temperature index ranges corresponding to the first preset index range include $-10°$ C.$\leq T<0°$ C., $0°$ C.$\leq T<10°$ C., $10°$ C.$\leq T<40°$ C. Then the second control circuit 24 determines, from $-10°$ C.$\leq T<0°$ C., $0°$ C.$\leq T<10°$ C., $10°$ C.$\leq T<40°$ C. according to the charging temperature which is $15°$ C., that the second preset index range is $10°$ C.$\leq T<40°$ C. In this case, the preset charging parameter corresponding to $10°$ C.$\leq T<40°$ C. is 0.2 C, and then 0.2 C is determined as the target charging parameter.

In this case, the first preset index range is a number index range, and the second preset index range is a temperature index range corresponding to the first preset index range.

When the charging temperature is selected as the first index value, the number of charging cycles is the second index value. In this case, after the first preset index range is determined from the temperature index ranges according to the charging temperature, the second preset index range is determined from the number index ranges corresponding to the first preset index range according to the number of charging cycles, and the preset charging parameter corresponding to the second preset index range is the preset charging parameter determined jointly by one number index range and one temperature index range, i.e., the target charging parameter. When the charging temperature is selected as the first index value, the number of charging cycles is the second index value. In this case, after the first preset index range is determined in the temperature index range according to the charging temperature, it is in the first preset index range according to the number of charging cycles A second preset index range is determined in the corresponding number index range, and the preset charging parameter corresponding to the second preset index range is the preset charging parameter determined jointly by a number index range and a temperature index range, that is, the target charging parameter.

For example, when the number of charging cycles acquired by the second control circuit 24 is 20 and the charging temperature acquired is $15°$ C., the second control circuit 24 determines, from the temperature index ranges according to the charging temperature which is $15°$ C., that the first preset index range is $10°$ C.$\leq T<40°$ C., and determines that number index ranges corresponding to the first preset index range include $N<50$, $50 \leq N<100$. Then the second control circuit 24 determines, from $N<50$, $50 \leq N<100$ according to the number of charging cycles which is 20, that the second preset index range is $N<50$. In this case, the preset charging parameter corresponding to $N<50$ is 0.2 C, and then 0.2 C is determined as the target charging parameter.

In this case, the first preset index range is a temperature index range, and the second preset index range is a number index range corresponding to the first preset index range.

It is understandable that the second preset index range is a range according to which the target charging parameter can be directly determined, and a type of the second preset index range includes a one-way current adjustment range and a current-voltage adjustment range.

If the type of the second preset index range is the one-way current adjustment range, the preset charging parameter corresponding to the second preset index range includes a current parameter;

if the type of the second preset index range is the current-voltage adjustment range, the preset charging parameter corresponding to the second preset index range includes a current parameter and a voltage parameter.

The current parameter is a preset charging rate; and the voltage parameter is a preset voltage factor, where the preset voltage factor is less than 1.

For example, when the charging temperature is the second index value, if the second preset index range determined according to the charging temperature is 40° C.≤T<45° C. and the type of the second preset index range is the current-voltage adjustment range, the preset charging parameter corresponding to the second preset index range includes a current parameter and a voltage parameter. By setting the current parameter and the voltage parameter under high temperature conditions, the second control circuit can charge the battery with a low voltage parameter when the charging temperature is too high, thereby preventing circuit damage.

S400: Charge the battery according to the target charging parameter.

When the determined target charging parameter is the preset charging rate, the charging the battery according to the target charging parameter includes: determining an actual charging current according to the preset charging rate, and charging the battery by using the actual charging current and a highest charging voltage of the battery. In this case, the charging current becomes the actual charging current, and the charging voltage is still the highest charging voltage of the battery.

The determining an actual charging current according to the preset charging rate includes: acquiring a battery capacity from the battery, and calculating the actual charging current according to the acquired battery capacity and the determined preset charging rate.

The actual charging current is a product of a battery capacity of the battery and the preset charging rate. The highest charging voltage of the battery is determined by the battery.

Because the charging current becomes the actual charging current and the charging voltage is still the highest charging voltage of the battery, when the actual charging current and the highest charging voltage of the battery are used to charge the battery, the DC-DC circuit 233 is controlled to adjust the charging current to the actual charging current, not the charging voltage, so that the charging voltage is still maintained at the highest charging voltage of the battery; then the second main loop switch 22 is controlled to switch on, so that the charging voltage and the charging current that has been adjusted by the DC-DC circuit 233 can be input to the first power port 11 through the second power port 21; and a control command is further sent to the first control circuit 14, to cause the first control circuit 14 to control the first main loop switch 12 to switch on, so that the charging current and the charging voltage input to the first power port 11 are input to the lithium battery pack 13, to charge the battery.

When the determined target charging parameter is the preset charging rate and the preset voltage factor, the charging the battery according to the target charging parameter includes: determining an actual charging current according to the preset charging rate, determining an actual charging voltage according to the preset voltage factor, and charging the battery by using the actual charging current and the actual charging voltage. In this case, the charging current becomes the actual charging current, and the charging voltage becomes the actual charging voltage.

The determining an actual charging current according to the preset charging rate includes: acquiring a battery capacity from the battery, and calculating the actual charging current according to the acquired battery capacity and the determined preset charging rate.

The actual charging current is a product of the battery capacity of the battery and the preset charging rate.

The determining an actual charging voltage according to the preset voltage factor includes: determining the highest charging voltage of the battery, and calculating the actual charging voltage according to the determined highest charging voltage and the preset voltage factor.

The actual charging voltage is a product of a highest charging voltage of the battery and the preset voltage factor. The highest charging voltage of the battery is determined by the battery.

Because the charging current becomes the actual charging current and the charging voltage becomes the actual charging voltage, when the battery is charged by using the actual charging current and the actual charging voltage, the DC-DC circuit 233 is controlled to adjust the charging current to the actual charging current and adjust the charging voltage to the actual charging voltage; then the second main loop switch 22 is controlled to switch on, so that the charging voltage and the charging current that have been adjusted by the DC-DC circuit 233 can be input to the first power port 11 through the second power port 21; and a control command is further sent to the first control circuit 14, to cause the first control circuit 14 to control the first main loop switch 12 to switch on, so that the charging current and the charging voltage input to the first power port 11 are input to the lithium battery pack 13, to charge the battery.

Figure 8:
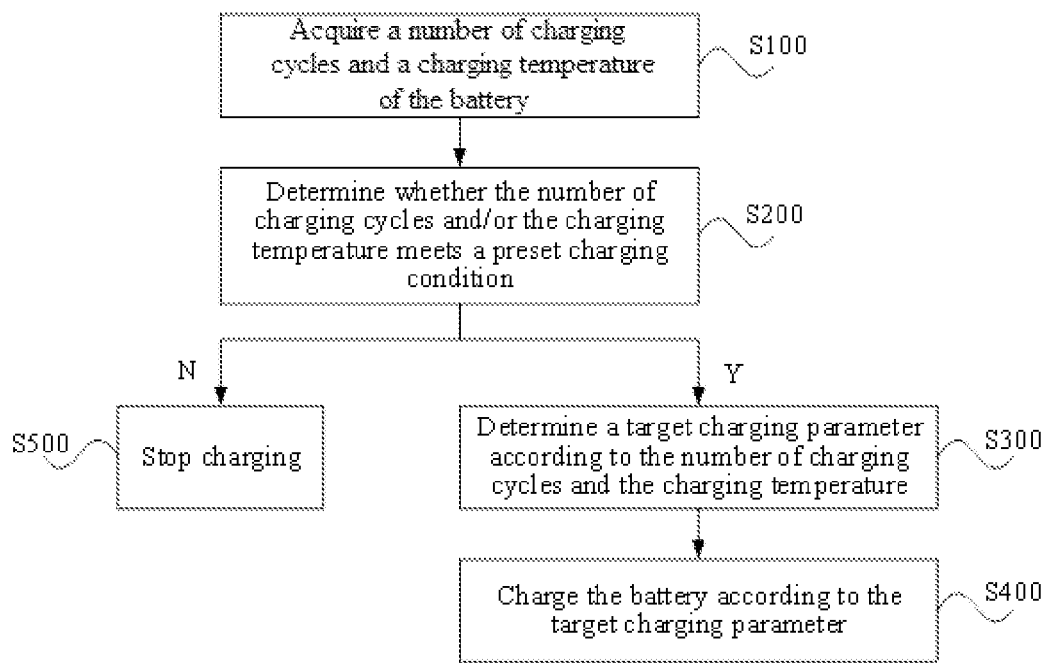
FIG. 8 is a schematic flowchart of a charging method according to another embodiment of the present invention.

Further, referring to FIG. 8, in some embodiments, when the temperature is too low or too high to determine the target charging parameter, in order to prevent the battery from being damaged by charging of the battery when the temperature is too high or too low, before the step of determining a target charging parameter according to the number of charging cycles and the charging temperature, the charging method further includes:

S200: Determine whether the number of charging cycles and/or the charging temperature meets a preset charging condition. If the preset charging condition is met, go to step S300; if the preset charging condition is not met, go to step S500.

The determining whether the acquired number of charging cycles and the acquired charging temperature meet a preset charging condition includes: determining whether the number of charging cycles is greater than a preset number threshold and/or whether the charging temperature falls within a preset normal temperature range.

If the number of charging cycles is greater than the preset number threshold and/or the charging temperature is not within the preset normal temperature range, it is determined that the preset charging condition is not met.

If the number of charging cycles is not greater than the preset number threshold and/or the charging temperature is within the preset normal temperature range, it is determined that the preset charging condition is met.

The preset number threshold is a maximum number of cycles that the lithium battery pack can allow, which is related to the properties of the lithium battery pack. Different lithium battery packs have different preset number thresholds. The user can look up the lithium battery instruction manual, and store the preset number threshold in advance.

The preset normal temperature range is a range of temperatures at which the lithium battery pack can operate. The preset normal temperature range is a temperature range pre-stored by the user according to the lithium battery instruction manual. Preferably, the preset normal temperature range is −10° C.-45° C., including the two endpoints −10° C. and 45° C. Based on this, when the charging temperature is less than −10° C. or greater than 45° C., it is determined that the charging temperature is not within the preset normal temperature range; when the charging temperature is not less than −10° C. and not greater than 45° C., it is determined that the charging temperature is within the preset normal temperature range.

S300: Determine a target charging parameter according to the number of charging cycles and the charging temperature.

This step is the same as step S300 shown in FIG. 7, and will not be repeated here.

S500: Stop charging.

Specifically, the second main loop switch 12 is controlled to switch off to prohibit the charging device from outputting the charging current and the charging voltage, and thus stop charging.

In the embodiments of the present invention, a target charging parameter for charging a battery is determined in real time according to a charging temperature and a number of charging cycles that are acquired from the battery, so that the determined target charging parameter can match the aging degree and the temperature state of the battery, thereby improving the safety of charging.

Embodiment 3

The following term "module" may refer to a combination of software and/or hardware having a predetermined function. Although the apparatus described in the following embodiments may be implemented by using software, it is also conceivable that the apparatus may be implemented by using hardware, or a combination of software and hardware.

Figure 9:
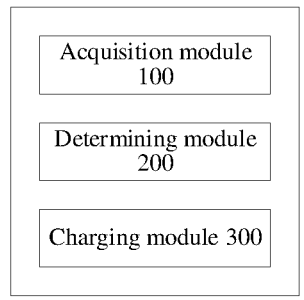
FIG. 9 is a schematic structural diagram of a charging apparatus according to an embodiment of the present invention.

Referring to FIG. 9, an embodiment of the present invention provides a charging apparatus. The apparatus is applied to a charging device and configured for charging a battery. The charging device is the charging device 20 described in the above-mentioned embodiment. The functions of the modules of the apparatus provided in this embodiment of the present invention are executed by the above-mentioned second control circuit 24 and is configured for determining in real time a target charging parameter for charging the battery. The charging apparatus includes:

an acquisition module 100, configured to acquire a number of charging cycles and a charging temperature of the battery;

a determining module 200, configured to determine a target charging parameter according to the number of charging cycles and the charging temperature; and a charging module 300, configured to charge the battery according to the target charging parameter.

Further, the acquisition module 100 is further configured to:
establish a communication port with the battery; and
acquire the number of charging cycles and the charging temperature of the battery based on the communication port.

Further, the determining module 200 is further configured to:

select any one of the number of charging cycles and the charging temperature as a first index value and the other one as a second index value, where each index value is configured for selecting a corresponding preset index range;

determine a second preset index range corresponding to the second index value in a first preset index range corresponding to the first index value; and determine a preset charging parameter corresponding to the second preset index range as the target charging parameter.

A type of the second preset index range includes a one-way current adjustment range and a current-voltage adjustment range;

if the type of the second preset index range is the one-way current adjustment range, the preset charging parameter corresponding to the second preset index range includes a current parameter; and if the type of the second preset index range is the current-voltage adjustment range, the preset charging parameter corresponding to the second preset index range includes a current parameter and a voltage parameter.

The current parameter is a preset charging rate; and
the voltage parameter is a preset voltage factor, where the preset voltage factor is less than 1.

Further, when the determined target charging parameter is the preset charging rate, the charging module 300 is further configured to:
determine an actual charging current according to the preset charging rate; and
charge the battery by using the actual charging current and a highest charging voltage of the battery.

The actual charging current is a product of a battery capacity of the battery and the preset charging rate.

Further, when the determined target charging parameter is the preset charging rate and the preset voltage factor, the charging module 300 is further configured to:
determine an actual charging current according to the preset charging rate; and
determine an actual charging voltage according to the preset voltage factor; and
charge the battery by using the actual charging current and the actual charging voltage.

The actual charging voltage is a product of a highest charging voltage of the battery and the preset voltage factor.

Figure 10:
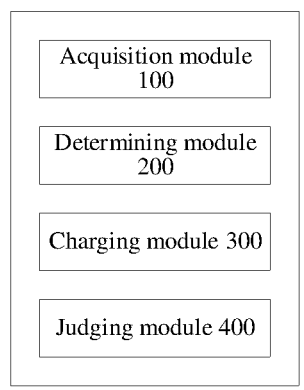
FIG. 10 is a schematic structural diagram of a charging apparatus according to another embodiment of the present invention.

Further, referring to FIG. 10, the charging apparatus further includes:

a judging module 400, configured to determine whether the number of charging cycles and/or the charging temperature meets a preset charging condition;

if yes, determine the target charging parameter according to the number of charging cycles and the charging temperature; and if not, stop charging.

Further, the judging module 400 is further configured to:
determine whether the number of charging cycles is greater than a preset number threshold and/or whether the charging temperature falls within a preset normal temperature range.

Of course, in some other alternative embodiments, the acquisition module 100, determining module 200, the charging module 300, and the judging module 400 may be a control chip.

The apparatus embodiment and the method embodiment are based on the same concept. Therefore, for the content of the apparatus embodiment, reference may be made to the method embodiment without mutual conflict among content, so the details will not be described herein again.

In the embodiments of the present invention, a target charging parameter for charging a battery is determined in real time according to a charging temperature and a number of charging cycles that are acquired from the battery, so that the determined target charging parameter can match the aging degree and the temperature state of the battery, thereby improving the safety of charging.

Embodiment 4

Figure 11:
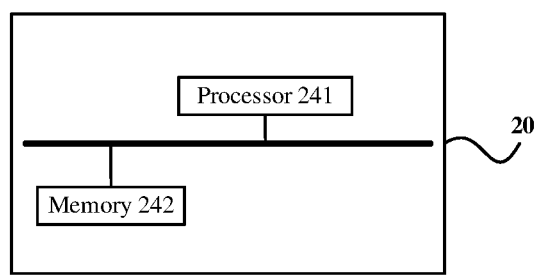
FIG. 11 is a schematic structural diagram of hardware of a charging device according to an embodiment of the present invention.

Refer to FIG. 11, which is a schematic structural diagram of hardware of a charging device according to an embodiment of the present invention. Hardware modules provided in this embodiment of the present invention may be integrated into the second control circuit 24 described in the above embodiment or may be directly used as the second control circuit 24 and disposed in the charging device, so that the charging device can perform the charging method described in the above embodiment and can further implement the functions of the various modules of the charging apparatus described in the above embodiment. The charging device 20 includes:

one or more processors 241 and a memory 242. In FIG. 11, one processor 241 is used as an example.

The processor 241 and the memory 242 may be connected through a bus or in other manners and are, for example, connected through a bus in FIG. 11.

As a non-volatile computer-readable storage medium, the memory 242 may be configured to store a non-volatile software program, a non-volatile computer-executable program and a module, for example, program instructions corresponding to the charging method and the modules (for example, the acquisition module 100, the determining module 200, the charging module 300 and the like) corresponding to the charging apparatus in the above embodiments of the present invention. The processor 241 executes various functional applications and data processing of the charging method by executing a non-volatile software program, an instruction and a module stored in the memory 242, that is, implements the charging method in the above method embodiment and the functions of the modules of the above apparatus embodiment.

The memory 242 may include a program storage area and a data storage area. The program storage area may store an operating system, an application program required by at least one function and the like. The data storage area may store data created according to use of a charging apparatus or the like.

The data storage area further stores preset data, including a preset index range, a preset charging parameter, a preset charging condition, a preset number threshold, a preset normal temperature range, etc.

In addition, the memory 242 may include a high-speed random access memory, and may also include a non-volatile memory, such as at least one magnetic disk storage device, a flash memory, or another volatile solid-state storage device. In some embodiments, the memory 242 optionally includes memories disposed remote to the processor 241, and these remote memories may be connected to the processor 241 through a network. Examples of the network include but are not limited to, the Internet, an intranet, a local area network, a mobile communication network, and a combination thereof.

The program instructions and one or more modules are stored in the memory 242, and the program instructions and the one or more modules, when executed by the one or more processors 241, perform steps of the charging method in any of the foregoing method embodiments, or implement functions of the modules of the charging apparatus in any of the foregoing apparatus embodiments.

For the foregoing product, the method provided in the embodiments of the present invention may be performed, and the corresponding functional modules for performing the method and beneficial effects thereof are provided. For technical details not described in detail in this embodiment, reference may be made to the method provided in the foregoing embodiments of the present invention.

An embodiment of the present invention further provides a non-volatile computer-readable storage medium, storing computer-executable instructions therein. The computer-executable instructions, when executed by one or more processors such as one processor 241 in FIG. 11, may cause a computer to perform steps of the charging method in any of the foregoing method embodiments, or implement functions of the modules of the charging apparatus in any of the foregoing apparatus embodiments.

An embodiment of the present invention further provides a computer program product, including a computer program stored on a non-volatile computer-readable storage medium. The computer program includes program instructions, and the program instructions, when executed by one or more processors such as one processor 241 in FIG. 11, may cause a computer to perform steps of the charging method in any of the foregoing method embodiments, or implement functions of the modules of the charging apparatus in any of the foregoing apparatus embodiments.

The described apparatus embodiment is merely an example. The modules described as separate parts may or may not be physically separated, and parts displayed as modules may or may not be physical units, may be located in one position, or may be distributed on a plurality of network units. Some or all of the modules may be selected based on an actual requirement, to implement an objective of the solution in this embodiment.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The foregoing storage medium may be a magnetic disk, an optical disc, a read-only memory (ROM), a random access memory (RAM) or the like.

The foregoing descriptions are embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:
1. A charging method, configured for charging a battery, the method comprising:
   acquiring a number of charging cycles and a charging temperature of the battery;

determining a target charging parameter according to the number of charging cycles and the charging temperature; and charging the battery according to the target charging parameter;

wherein the determining a target charging parameter according to the number of charging cycles and the charging temperature comprises:

selecting the charging cycles and as a first index value and the charging temperature as a second index value, wherein each index value is configured for selecting a corresponding preset index range;

determining a second preset index range corresponding to the second index value in a first preset index range corresponding to the first index value; and determining a preset charging parameter corresponding to the second preset index range as the target charging parameter;

wherein a type of the second preset index range comprises a one-way current adjustment range and a current-voltage adjustment range;

when the type of the second preset index range is the one-way current adjustment range, the preset charging parameter corresponding to the second preset index range comprises a current parameter; and when the type of the second preset index range is the current-voltage adjustment range, the preset charging parameter corresponding to the second preset index range comprises a current parameter and a voltage parameter;

the current parameter is a preset charging rate; and the voltage parameter is a preset voltage factor, wherein the preset voltage factor is less than 1.

2. The charging method according to claim 1, wherein when the determined target charging parameter is the preset charging rate, the charging the battery according to the target charging parameter comprises:

determining an actual charging current according to the preset charging rate; and charging the battery by using the actual charging current and a highest charging voltage of the battery.

3. The charging method according to claim 2, wherein the actual charging current is a product of a battery capacity of the battery and the preset charging rate.

4. The charging method according to claim 1, wherein when the determined target charging parameter is the preset charging rate and the preset voltage factor, the charging the battery according to the target charging parameter comprises:

determining an actual charging current according to the preset charging rate; and determining an actual charging voltage according to the preset voltage factor; and charging the battery by using the actual charging current and the actual charging voltage.

5. The charging method according to claim 4, wherein the actual charging voltage is a product of a highest charging voltage of the battery and the preset voltage factor.

6. The charging method according to claim 1, wherein before the determining a target charging parameter according to the number of charging cycles and the charging temperature, the method further comprises:

determining whether the number of charging cycles and/or the charging temperature meets a preset charging condition;

when the number of charging cycles and/or the charging temperature meets a preset charging condition, determining the target charging parameter according to the number of charging cycles and the charging temperature; and when the number of charging cycles and/or the charging temperature doesn't meet a preset charging condition, stopping charging.

7. The charging method according to claim 6, wherein the determining whether the number of charging cycles and/or the charging temperature meets a preset charging condition comprises:

determining whether the number of charging cycles is greater than a preset number threshold and/or whether the charging temperature falls within a preset normal temperature range.

8. The charging method according to claim 1, wherein the acquiring a number of charging cycles and a charging temperature of the battery comprises:

establishing a communication port with the battery; and acquiring the number of charging cycles and the charging temperature of the battery based on the communication port.

9. A charging apparatus, configured for charging a battery, the apparatus comprising:

a memory storing computer executable instructions; and a processor configured to execute the instructions to:

acquire a number of charging cycles and a charging temperature of the battery;

determine a target charging parameter according to the number of charging cycles and the charging temperature; and charge the battery according to the target charging parameter;

the processor is further configured to:

select any one of the number of charging cycles as a first index value and the charging temperature as a second index value, wherein each index value is configured to select a corresponding preset index range;

determine a second preset index range corresponding to the second index value in a first preset index range corresponding to the first index value; and determine a preset charging parameter corresponding to the second preset index range as the target charging parameter;

wherein a type of the second preset index range comprises a one-way current adjustment range and a current-voltage adjustment range;

when the type of the second preset index range is the one-way current adjustment range, the preset charging parameter corresponding to the second preset index range comprises a current parameter; and when the type of the second preset index range is the current-voltage adjustment range, the preset charging parameter corresponding to the second preset index range comprises a current parameter and a voltage parameter;

the current parameter is a preset charging rate; and the voltage parameter is a preset voltage factor, wherein the preset voltage factor is less than 1.

10. The charging apparatus according to claim 9, wherein when the determined target charging parameter is the preset charging rate, the processor is further configured to:

determine an actual charging current according to the preset charging rate; and charge the battery by using the actual charging current and a highest charging voltage of the battery.

11. The charging apparatus according to claim 10, wherein the actual charging current is a product of a battery capacity of the battery and the preset charging rate.

12. The charging apparatus according to claim 9, wherein when the determined target charging parameter is the preset charging rate and the preset voltage factor, the processor is further configured to:
determine an actual charging current according to the preset charging rate; and
determine an actual charging voltage according to the preset voltage factor; and
charge the battery by using the actual charging current and the actual charging voltage.

13. The charging apparatus according to claim 12, wherein the actual charging voltage is a product of a highest charging voltage of the battery and the preset voltage factor.

14. The charging apparatus according to claim 9, wherein the processor is further configured to:
determine whether the number of charging cycles and/or the charging temperature meets a preset charging condition;
when the number of charging cycles and/or the charging temperature meets a preset charging condition, determine the target charging parameter according to the number of charging cycles and the charging temperature; and
when the number of charging cycles and/or the charging temperature doesn't meet a preset charging condition, stop charging.

15. The charging apparatus according to claim 14, wherein the processor is further configured to:
determine whether the number of charging cycles is greater than a preset number threshold and/or whether the charging temperature falls within a preset normal temperature range.

16. The charging apparatus according to claim 9, wherein the processor is further configured to:
establish a communication port with the battery; and
acquire the number of charging cycles and the charging temperature of the battery based on the communication port.

17. A charging device, comprising:
at least one processor; and
a memory communicably connected to the at least one processor, the memory storing instructions executable by the at least one processor, the instructions being executed by the at least one processor to cause the at least one processor to execute:
acquiring a number of charging cycles and a charging temperature of the battery;
determining a target charging parameter according to the number of charging cycles and the charging temperature; and
charging the battery according to the target charging parameter; wherein the determining a target charging parameter according to the number of charging cycles and the charging temperature comprises:
selecting the charging cycles and as a first index value and the charging temperature as a second index value, wherein each index value is configured for selecting a corresponding preset index range;
determining a second preset index range corresponding to the second index value in a first preset index range corresponding to the first index value; and
determining a preset charging parameter corresponding to the second preset index range as the target charging parameter;
wherein a type of the second preset index range comprises a one-way current adjustment range and a current-voltage adjustment range;
when the type of the second preset index range is the one-way current adjustment range, the preset charging parameter corresponding to the second preset index range comprises a current parameter; and
when the type of the second preset index range is the current-voltage adjustment range, the preset charging parameter corresponding to the second preset index range comprises a current parameter and a voltage parameter;
the current parameter is a preset charging rate; and
the voltage parameter is a preset voltage factor, wherein the preset voltage factor is less than 1.

18. A charging system, comprising:
a battery;
at least one processor; and
a memory communicably connected to the at least one processor, the memory storing instructions executable by the at least one processor, the instructions being executed by the at least one processor to cause the at least one processor to execute:
acquiring a number of charging cycles and a charging temperature of the battery;
determining a target charging parameter according to the number of charging cycles and the charging temperature; and
charging the battery according to the target charging parameter,
wherein the processor communicates with the battery through a communication port;
wherein the determining a target charging parameter according to the number of charging cycles and the charging temperature comprises:
selecting the charging cycles and as a first index value and the charging temperature as a second index value, wherein each index value is configured for selecting a corresponding preset index range;
determining a second preset index range corresponding to the second index value in a first preset index range corresponding to the first index value; and
determining a preset charging parameter corresponding to the second preset index range as the target charging parameter;
wherein a type of the second preset index range comprises a one-way current adjustment range and a current-voltage adjustment range;
when the type of the second preset index range is the one-way current adjustment range, the preset charging parameter corresponding to the second preset index range comprises a current parameter; and
when the type of the second preset index range is the current-voltage adjustment range, the preset charging parameter corresponding to the second preset index range comprises a current parameter and a voltage parameter;
the current parameter is a preset charging rate; and
the voltage parameter is a preset voltage factor, wherein the preset voltage factor is less than 1.

19. A non-transitory computer readable storage medium, storing computer executable instructions therein, the computer executable instructions being configured to cause a charging device to execute:
acquiring a number of charging cycles and a charging temperature of the battery;

determining a target charging parameter according to the number of charging cycles and the charging temperature; and charging the battery according to the target charging parameter;

wherein the determining a target charging parameter according to the number of charging cycles and the charging temperature comprises:

selecting the charging cycles and as a first index value and the charging temperature as a second index value, wherein each index value is configured for selecting a corresponding preset index range;

determining a second preset index range corresponding to the second index value in a first preset index range corresponding to the first index value; and determining a preset charging parameter corresponding to the second preset index range as the target charging parameter;

wherein a type of the second preset index range comprises a one-way current adjustment range and a current-voltage adjustment range;

when the type of the second preset index range is the one-way current adjustment range, the preset charging parameter corresponding to the second preset index range comprises a current parameter; and when the type of the second preset index range is the current-voltage adjustment range, the preset charging parameter corresponding to the second preset index range comprises a current parameter and a voltage parameter;

the current parameter is a preset charging rate; and the voltage parameter is a preset voltage factor, wherein the preset voltage factor is less than 1.

* * * * *